United States Patent [19]
Ha

[11] Patent Number: 5,584,208
[45] Date of Patent: Dec. 17, 1996

[54] AUTOMATIC TRANSMISSION SYSTEM

[76] Inventor: Jin Soo Ha, 17578 Tuscan Dr., Granada Hills, Calif. 91344

[21] Appl. No.: 414,943

[22] Filed: Mar. 31, 1995

[51] Int. Cl.⁶ ............................ F16H 3/08; F16H 59/18; F16H 59/40; F16H 59/54; F16H 59/70
[52] U.S. Cl. .................. 74/331; 74/333; 74/335; 477/75; 477/80; 477/92; 477/95
[58] Field of Search ................... 477/75, 79, 80, 477/92, 95; 74/331, 333, 335

[56] References Cited

U.S. PATENT DOCUMENTS

| | | | |
|---|---|---|---|
| 4,648,290 | 3/1987 | Dunkley et al. | 477/70 X |
| 4,823,629 | 4/1989 | Ha . | |
| 4,899,857 | 2/1990 | Tateno et al. | 477/78 X |
| 5,012,690 | 5/1991 | Bulgrien | 74/335 |
| 5,105,675 | 4/1992 | Langford et al. | 74/335 |
| 5,444,623 | 8/1995 | Genise | 74/335 X |

FOREIGN PATENT DOCUMENTS 1759668  9/1992  U.S.S.R. .................. 74/333

*Primary Examiner*—Charles A. Marmor
*Assistant Examiner*—Nathan O. Jensen
*Attorney, Agent, or Firm*—Birch, Stewart, Kolasch & Birch, LLP

[57] ABSTRACT

An automatic transmission system includes a drive device, electronic control and a valve control. An accelerator pedal, a brake pedal, speedometer and a gear will send signals to the electronic control. Based on these signals, the electronic control will control the valve control. Hydraulic fluid is provided to the drive device based upon operation of the valves in the valve control. The drive device contains a plurality of clutches for each of the valves of the valve control. These clutches are sequentially engaged by sequential operation of the valves in order to connect the engine shaft with an axle of the vehicle to thereby drive the vehicle.

6 Claims, 5 Drawing Sheets

AUTOMATIC TRANSMISSION SYSTEM

BACKGROUND OF THE INVENTION

1. Field of the Invention

The present invention relates to an automatic transmission for a vehicle. More particularly, the present invention relates to an automatic transmission system with an electronic control means connected to a valve control means for controlling a drive means which is engageable or disengageable with a shaft of the engine.

2. Description of the Background Art

There are many types of automatic transmissions which are well known in the art which utilize a torque converter for use in automatic transmissions. Use of automatic transmissions, however, have several disadvantages. For example, they require a lot of gasoline for operating a hydraulic oil pressure system connected to the torque converter during shifting between gear range positions. It is also difficult to install or assemble such conventional transmission systems since they have a very complicated structure.

SUMMARY OF THE INVENTION

Accordingly, it is an object of the present invention to provide an automatic transmission system for saving gasoline. Along these lines, another object of the present invention is to provide an automatic transmission system which avoids a torque converter.

A further object of the present invention is to provide an automatic transmission system with a reduced number of parts compared to conventional systems.

A third object of the present invention is to provide an automatic transmission system which is relatively quiet.

Yet another object of the present invention is to provide an automatic transmission system which can easily be installed, assembled or maintained.

These and other objects of the present invention are filled by providing an automatic transmission with a drive means, electronic control means and valve control means. The electronic control means is electrically connected to the accelerator pedal, the brake pedal, the speedometer and the gear selector of the vehicle. Signals will be sent from these various elements to the electronic control means. In response to these signals, the electronic control means will sequentially operate one of a plurality of valves provided in the valve control means. These valves are connected to clutches in the drive means. When a valve operates a clutch, the clutch will then be connected between the engine shaft and the axle of the vehicle to thereby drive the vehicle. These clutches are sequentially operated in response to sequential operation of the valves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
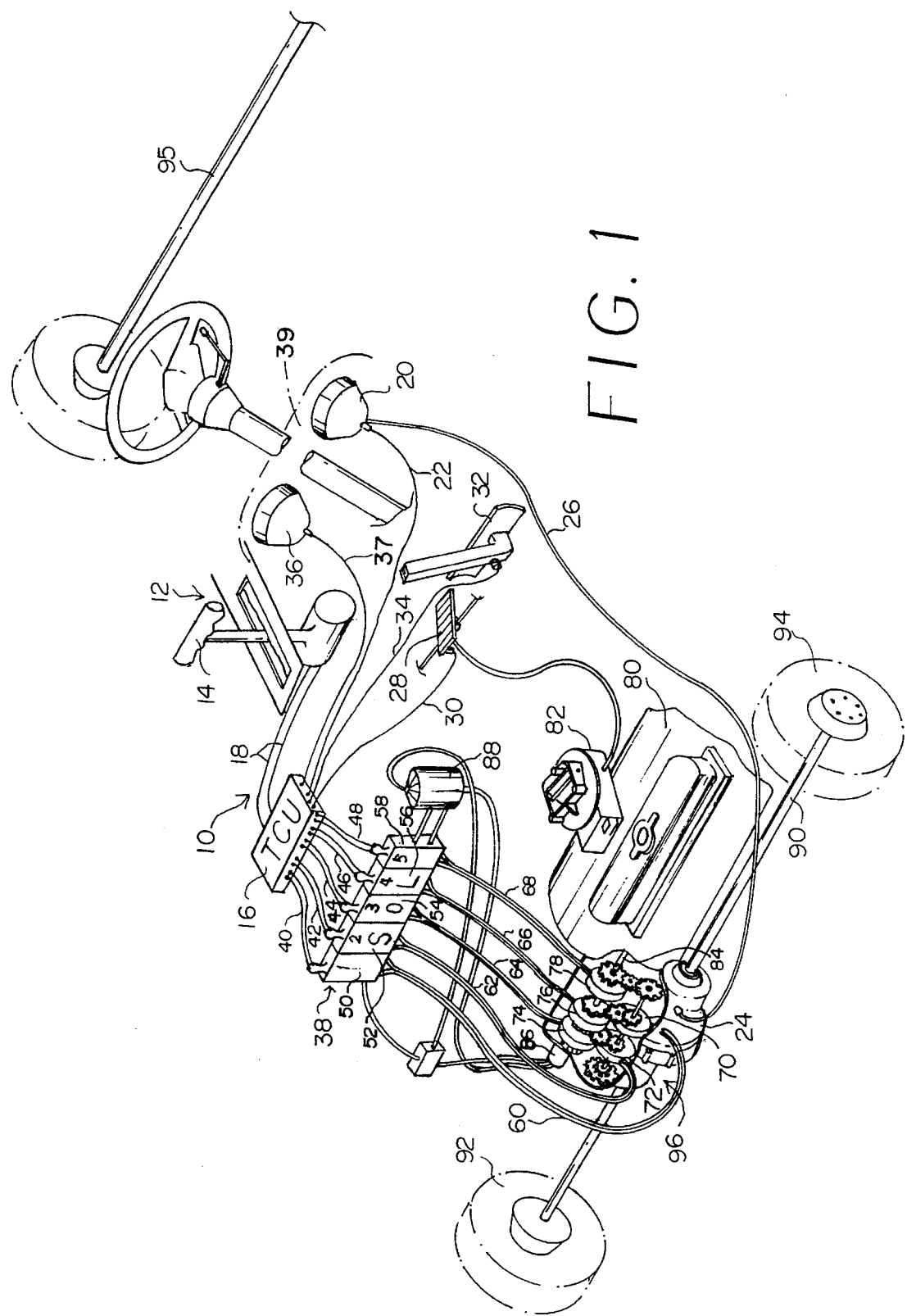
FIG. 1 is a perspective view of the automatic transmission system showing the basic components of the present invention.

Referring in detail to the drawings and with particular reference to FIG. 1, an automatic transmission system 10 is shown. This system includes a gear selector 12 having a shift lever 14. The gear selector 12 is electrically connected to the electronic control means 16 through wires 18. Upon movement of the gear shift lever 14 to the drive position, a drive signal will be sent to the electronic control means 16.

A speedometer 20 is also electrically connected to the electronic control means 16 by a wire 22. The speedometer 20 will send a speed signal to the electronic control means 16. The speedometer 20 is also connected to a differential gear housing 24 through wire 26. In that matter, the speedometer 20 can monitor the speed of the vehicle.

An accelerator pedal 28 is connected to the electronic control means 16 through wire 30. An acceleration signal is sent through the wire 30 when the accelerator pedal 28 is depressed.

Brake 32 is also connected to the electronic control means 16 through wire 34. When the brake pedal 32 is depressed, a braking signal will be sent to the electronic control means 16.

A tachometer 36 is also provided. This tachometer 36 is connected to the electronic control means 16 through wire 37. The speedometer 20 and tachometer 36 are provided in a dashboard 39 of the vehicle.

The electronic control means 16 is electrically connected to valve control means 38. Sets of wires 40,42,44,46 and 48 are connected to respective solenoid valves 50,52,54,56 and 58. These wires 40–48 will send signals from the electronic control means 16 in order to open and close the respective valves 50–58. It should be noted that the valves 50–58 will be sequentially operated as will be described below. Only one valve 50–58 will be opened at a time.

It should be noted that while solenoid valves 50–58 have been discussed, any suitable valving arrangement could be used. Adjacent to the valve control means 38 is an oil filter 88.

Extending from each of the valves 50–58 is an hydraulic conduit 60,62,64,66 and 68. Each of these conduits 60–68 is connected to a clutch in the differential gear housing 24. A plurality of clutches 70,72,74,76 and 78 are provided. These clutches will be described in more detail below.

Adjacent to the differential gear housing 24 is the engine 80 of the vehicle. The carburetor 82 is provided above engine 80 and is operatively connected to the accelerator pedal 28.

An engine shaft 84 extends from engine 80. Three of the clutches 74,76 and 78 are mounted on this engine shaft 84 in the embodiment of FIG. 1. At the end of engine shaft 84 is an oil pump 86. The oil pump 86 is directly in line with and engaged with the engine shaft 84. Rotation of the engine shaft 82 will drive the oil pump 86. Oil flowing from the clutches 70–78 will move through the oil pump 86 back to the solenoid valves 50,52,54,56 and 58.

Extending from the differential gear housing 24 is the axle 90 of the vehicle. The forward wheels 92 and 94 are connected to this axle 90. A rear axle 95 is also shown in FIG. 1. While the automatic transmission system 10 of the present invention is described for use with a front wheel vehicle, it should be appreciated that such a drive system could equally be used with a rear wheel drive vehicle.

Figure 2:
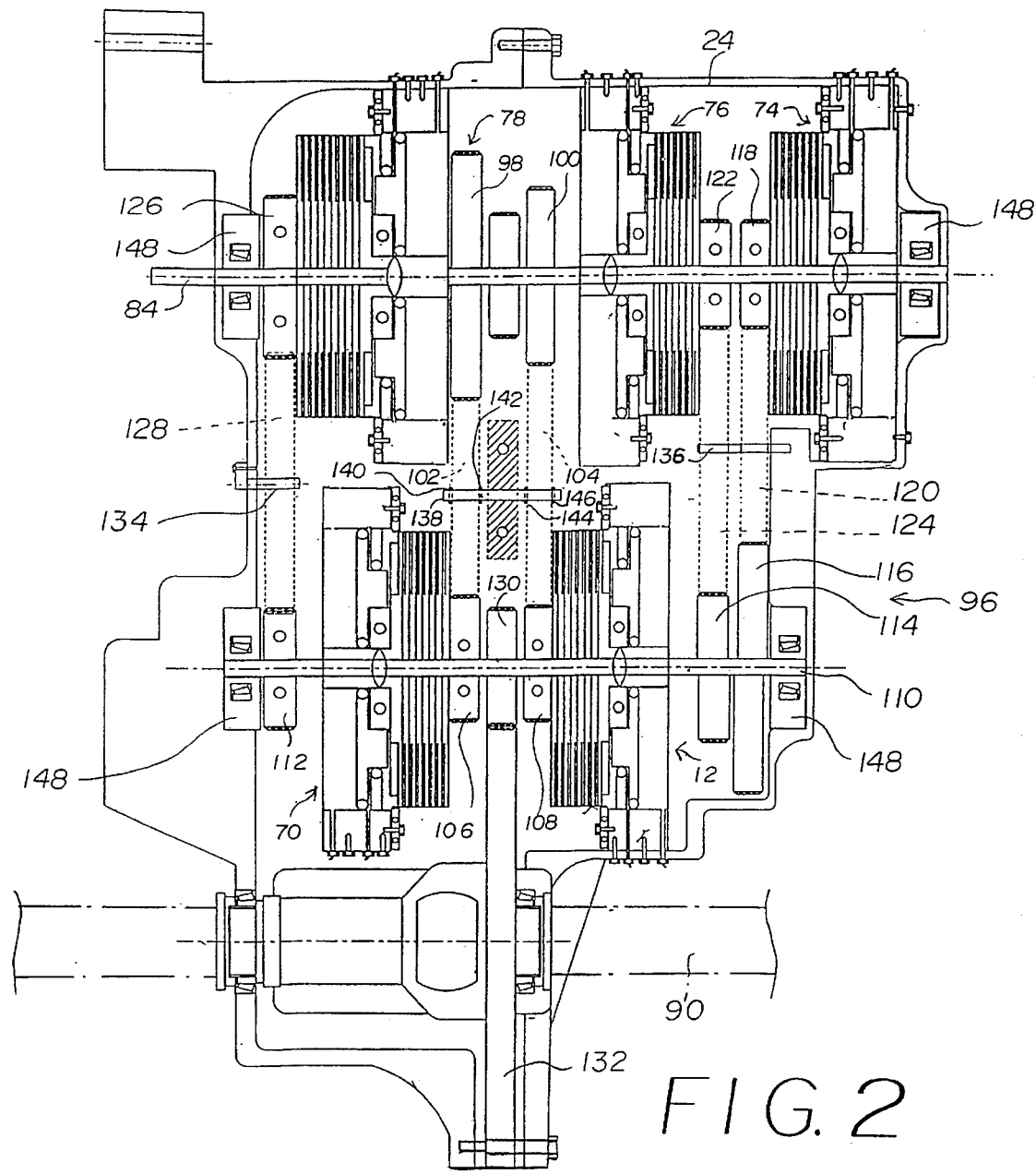
FIG. 2 is a top plan, sectional view of a first embodiment having two shafts of a drive control means of the present invention.

Turning now to FIG. 2, a first embodiment of a drive control means 96 of the present invention will now be described. The first embodiment of the drive control means 96 has clutches mounted on two shafts as opposed to a three shaft arrangement for the second embodiment to be described below. This first embodiment of the drive control means 96 is located within the differential gear housing 24. The engine shaft 84 extends into housing 24. Three clutches 78,76 and 74 are mounted on this shaft 84. These clutches will be described in more detail below. Rotation of shaft 84 does not rotate the clutches 74,76 or 78 unless said clutches are in an activated mode.

Additionally mounted on engine shaft 84 are two gears 98 and 100. Rotation of the engine shaft 84 will rotate these gears 98,100. Gear 98 is geared to intermediate gear 102 while gear 100 is geared to intermediate gear 104. These intermediate gears 102 and 104 are then geared to respective gears 106 and 108. It should be appreciated that rotation of gear 98 will drive intermediate gear 102 and gear 106. Driving of gear 106 will also cause the drum of clutch 70 to rotate. Likewise, rotation of gear 100 will drive intermediate gear 104 and gear 108 in order to rotate the drum of clutch 72. These clutches 70,72,74,76 and 78 will be described in more detail below. The clutches are basically the same except some clutches are mounted in a backwards or mirror image orientation to the other clutches.

Clutches 70 and 72 are mounted on a second shaft 110. Shaft 110 and engine shaft 84 are rotatably mounted on bearings 148. Plates of the clutches 70 and 74 are mounted on this second shaft 110 as will be described in detail below. The second shaft 110 also has gears 112,114 and 116 mounted thereon. When the third clutch 74 is activated, gear 118, intermediate gear 120 and subsequently gear 116 will be driven. Likewise, when the fourth clutch 76 is activated, gear 122, intermediate gear 124 and subsequently gear 114 will be driven. Similarly, when the fifth clutch 78 is activated, gear 126 will be driven to drive intermediate gear 128 and gear 112. Rotation of any of these gear sets 118,120,116; 122,124,114; or 126,128,112 will cause the second shaft 110 to rotate.

Rotation of shaft 110 will drive gear 130 and then drive the axle 90 through connection 132. Thereby, operation of any of the clutches 70,72,74,76 or 78 will drive the second shaft 110 in order to drive the axle 90 and cause the vehicle to move.

The intermediate gears 128,102,104,124 and 120 are mounted so as to be readily removable from the differential gear housing 24. In particular, intermediate gear 128 is rotatably mounted on rotation rod or axis 134. The two intermediate gears 102 and 124 are mounted on axis 138. The remaining two intermediate gears 124 and 120 are rotatably mounted on axis 138. Each of these axis extends from a post mounted to a cover of the differential gear housing 24. For example, post 140,142,144 and 146 support axis 138. When the cover of the differential gear housing 24 is removed, the posts will be lifted from the gear housing in order to remove the respective intermediate gears 128,102, 104,124 and 120.

Figure 3:
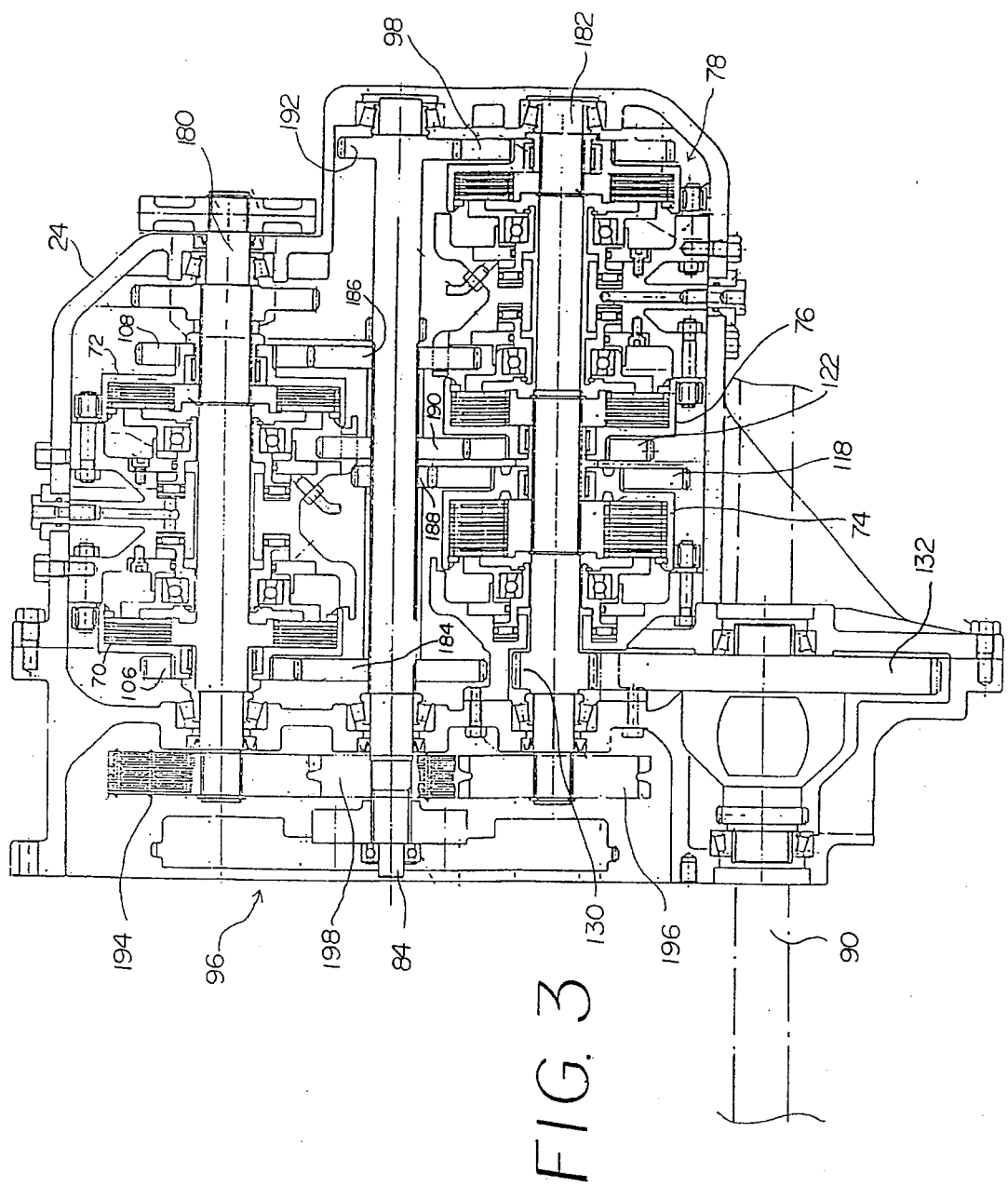
FIG. 3 is a top plan, sectional view of second embodiment having three shafts of the drive control means of the present invention.
Figure 4:
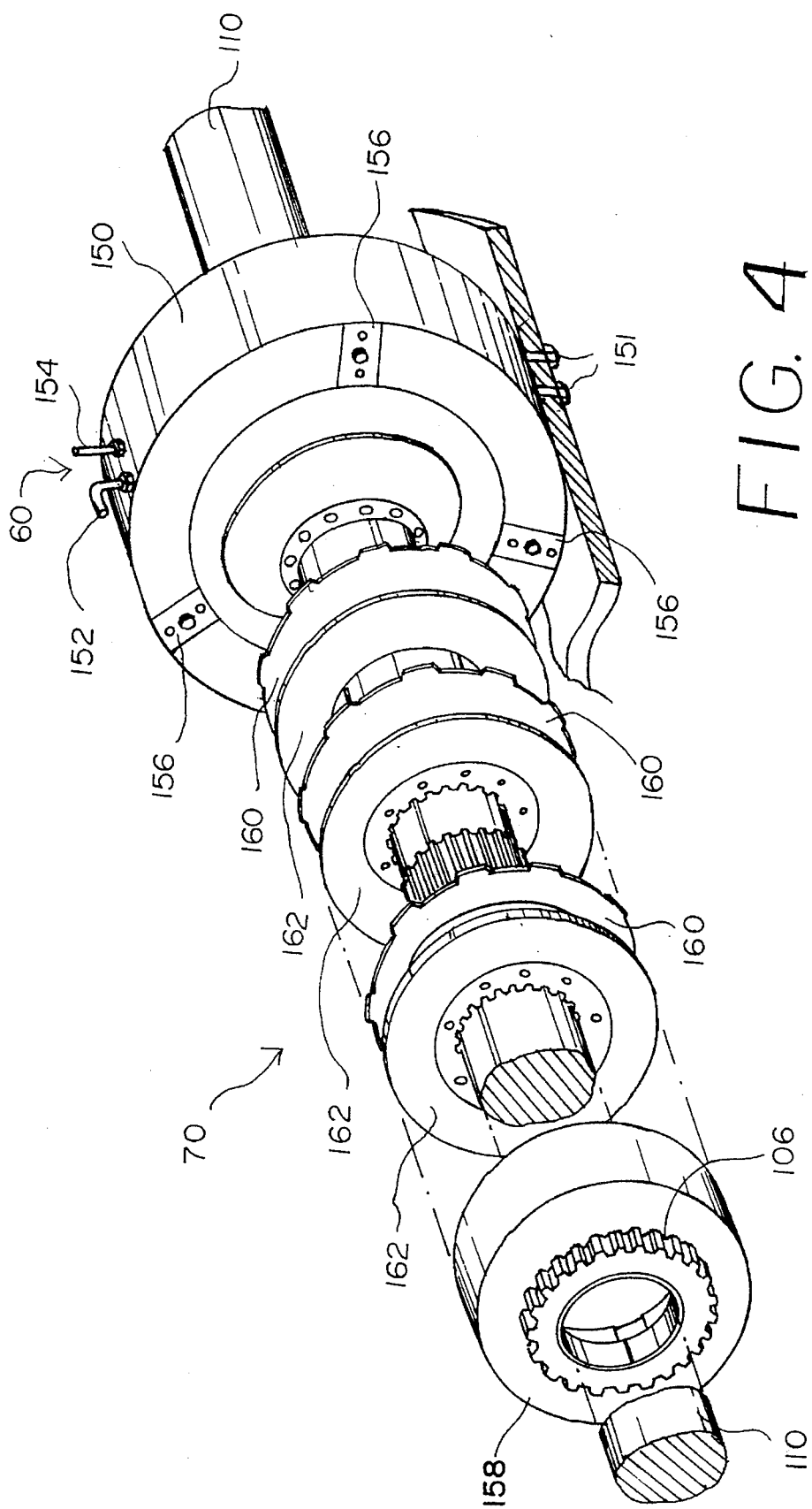
FIG. 4 is a side perspective exploded view of one of the clutches of the present invention.
Figure 5:
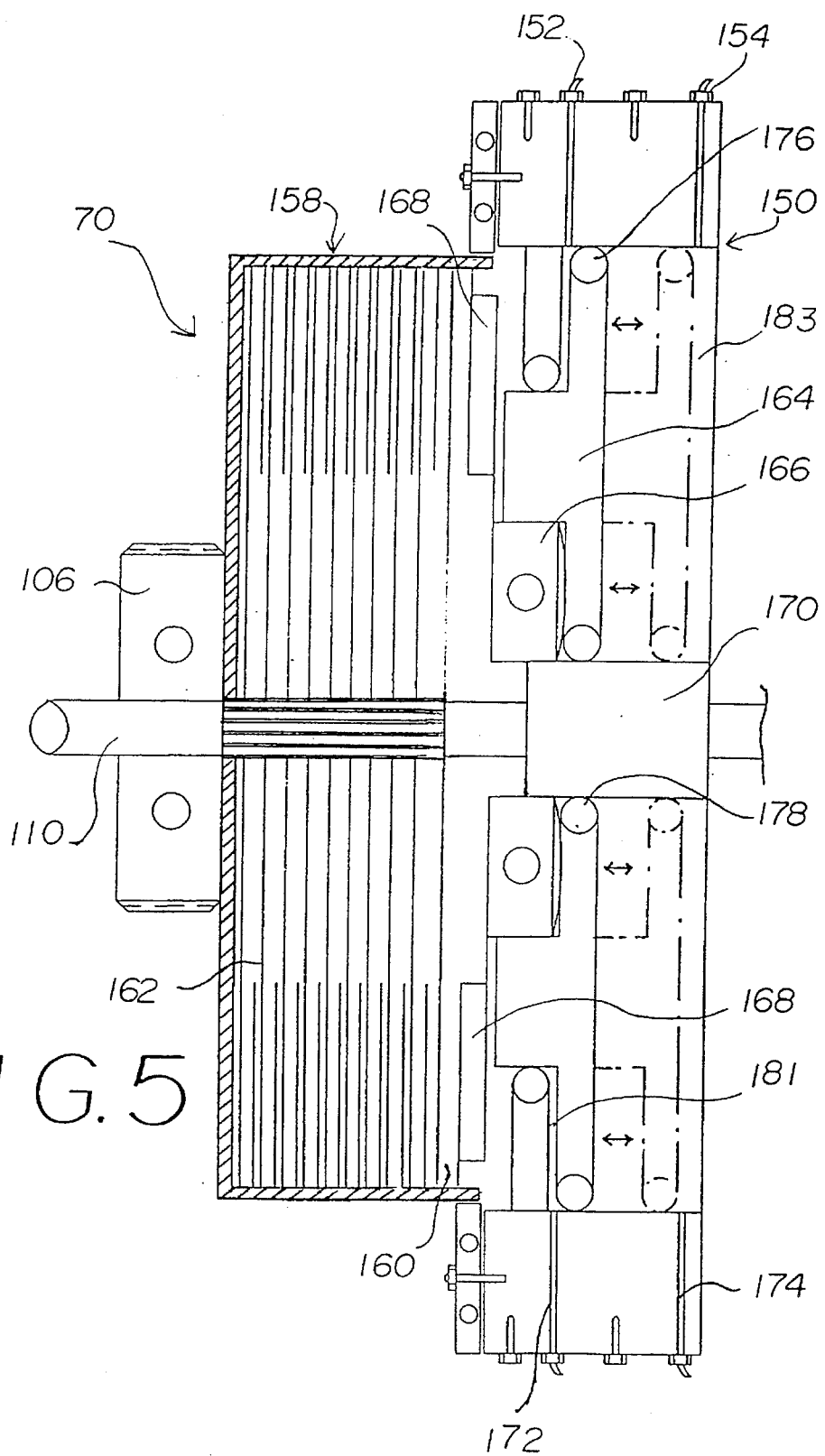
FIG. 5 is a side sectional view of one of the clutches of the present invention.

Turning now to FIGS. 4 and 5, one of the clutches of the present invention will be described. While this clutch is referenced as the first clutch 70, it should be appreciated that this description also equally applies to the second, third, fourth and fifth clutches 72,74,76,78, respectively. The construction of the clutches is basically the same except that the orientation of the clutches on the shaft may be reversed as indicated in FIGS. 2 and 3.

Because the first clutch 70 is shown in FIG. 4, it is mounted on shaft 110. As noted above, the second clutch 72 is also mounted on the shaft 110. If, however, the third, fourth or fifth clutches 74,76 or 78 were to be described, they would be mounted on shaft 84. When the second embodiment of FIG. 3 is discussed below, it should be apparent which of the shafts the respective clutch would be mounted on.

The clutch 70 includes a non-rotatable drum. The drum housing 150 is non-rotatably mounted on the differential gear housing 24 such as by screws 151. Any suitable mounting arrangement can be used, however. Because the first clutch 70 is described, the hydraulic conduit 60 is indicated in this FIG. 4. It should be appreciated that whichever clutch is utilized, then the respective hydraulic conduit for that clutch would be provided. The hydraulic conduit 60 includes a first port 152 and a second port 154. Hydraulic fluid such as oil can be supplied through these ports 152 and 154.

Mounted on the exterior of the drum housing 150 are three equal distantly spaced bearings 156. These bearings 156 will engage a rotatable drum 158 in order to prevent wabbling of the drum during rotation.

As shown in FIG. 5, within drum 158 are a plurality of plates and discs. An exploded view of FIG. 4 shows three plates 160 and three discs 162. While three sets of plates and discs are shown, it should be appreciated that any number of plates and discs can be used.

The plates 160 are non-rotatably mounted on the drum 158. Both the drum 158 and plates 160 can be rotated as a unit as will be described below.

Additionally mounted on shaft 110 are the discs 162. Rotation of these discs 162 will cause shaft 110 to rotate. At the end of the drum 158 is gear 106. As should readily be understood, the second, third, fourth and fifth bearings 72,74,76 and 78 would have their respective gears 108,118, 122, and 126 mounted at the ends thereof.

Turning now to FIG. 5, a side sectional view of the first clutch 70 is shown. It will be emphasized again that while the description is of the first clutch 70, it is also equally applicable to the other clutches 72,74,76 and 78. Within the drum housing 150, a movable piston 164 is provided. This piston 164 is connected to bearing 166 which is connected to engagement member 168. Movement of piston 164 will move bearing 166 and engagement member 168. The engagement member 168 is an annular plate. Of course, any suitable arrangement for this engagement member 168 can be used.

In order to move the piston 164, the bearing 166 and the engagement plate 168, oil, hydraulic fluid, air pressure or any other suitable media can be introduced through the ports 152,154 to chambers 181 or 183, respectively. In particular, introduction of fluid through port 154 will cause the piston 164, bearing 166 and engagement member 168 to move to the left as seen in FIG. 5. On the other hand, introduction of fluid through port 152 will cause the piston 164 and its associated structure to be moved to the right in FIG. 5. The bearing 166 and piston 164 are mounted on a movable coupling 170. This coupling 170 freely slides on the second shaft 110. The shaft 110 is rotatable while the housing 150 can remain stationary due to the coupling 170.

Upon introduction of fluid through port 154 and movement of the piston 164 to the left, the engagement member 168 will contact a first plate 160. Eventually, sufficient force is supplied such that all the plates 160 will be engaged and thereby all discs 162 will be in contact with the plates 160. Engagement of the plates 160 with the discs 162 causes the drum 158 to be operatively engaged with the shaft 110. In other words, the disc 162 which is originally mounted on the second shaft 110 will begin to rotate with the engaged plates 160 on drum 158. This drum 158 is driven through gear 106. Thereby, a connection is made such that the first clutch 170 to drive the axle 90 in response to rotation of the engine shaft 84. The second, third, fourth and fifth clutches 72,74,76 and 78 will similarly drive the axle 90 as should be apparent from the foregoing description.

It should be noted that secondary ports 172 and 174 are shown in FIG. 5. Any number of inlets and outlets for fluids can be provided around the drum housing 150. Alternatively, a single pair of ports can be provided. The piston 164 has an annular shape. Adjacent its inner and outer circumferential edges, O-rings 176 and 178 are provided. These O-rings prevent fluid from leaking from the first chamber 181 to the second chamber 183 in the drum housing 150. Other suitable O-rings can be used throughout the housing 150 which should be apparent to one skilled in the art.

Turning now to FIG. 3, a second embodiment of the drive control means 96 of the present invention will be described. This drive control means 96 is a three-shaft design. The engine shaft 84 extends from the engine 80 similarly to the first embodiment. However, none of the clutches 70–78 are mounted directly thereon. Within the differential gear housing 24, a first shaft 180 and a second shaft 182 are also provided. These shafts 180 and 182 are rotatably mounted in the housing 24.

Mounted on the first shaft 180 are the first and second clutches 70,72. On the second shaft 182, the third, fourth and fifth clutches 74,76 and 78, respectively, are mounted. The drums of these clutches 70–78 are continuously driven during rotation of the engine shaft 84 as will be described below. It should be appreciated that the clutches 70–78 are similar to those clutches previously described. A detailed description of these clutches will not now be given.

Mounted on the engine shaft and rotatable with the shaft are gears 184,186,188 and 190. The end of this shaft has an enlarged section forming a gear 192. While this section 192 is shown as a part of the engine shaft 184, it should be appreciated that a separate gear could be mounted at the end of this engine shaft 184.

Gear 184 is operatively geared with gear 106 of the first clutch 70. Gear 186 is operatively geared with gear 108 of the second clutch 72. Gear 188 is operatively geared with the gear 118 of the third clutch 74 and gear 190 is operatively geared with the gear 122 of the fourth clutch 76. Geared end 192 of the shaft 84 is operatively geared with the gear 98 of the fifth clutch 78. Rotation of the engine shaft 84 will therefore drive the gears 184,186,188,190 and the geared end 192 in order to drive the respective gears 106,108,118, 122 and 98 of the clutches 70,72,74,76 and 78, respectively.

In order to rotate the first shaft 180, the first clutch 70 or second clutch 72 merely needs to be actuated. If the first clutch or second clutch 72 have their plates and discs 160,162 in engagement, then shaft 180 will be rotated in order to drive gear 184. Rotation of gear 194 will drive gear 196 through connection 198. Upon driving of gear 196, the second shaft 182 will be rotated. It should be noted that unless one of the clutches 70–78 is actuated, the shafts 180 and 182 will not rotate despite the drums of 158 of the various clutches being rotated.

Upon rotation of the second shaft 182, the axle 90 will be driven through rotation of gear 130 and connection 132. Rotation of axle 90 will cause the vehicle to move.

If the third, fourth or fifth clutches 74,76 or 78 are actuated, then their discs 162 will engage their respective plates 160. These discs 162 of clutches 74,76 and 78 are fixedly mounted on the second shaft 182. Upon engagement of the plates 160 with the discs 162, the second shaft 182 will be driven through the rotating drum 158. Supply of fluid or other suitable medium to the drum housing 150 of the various clutches 70,72,74,76 and 78 will cause engagement and disengagement of the plates 160 and discs 162 as described above.

Through the automatic transmission system of the present invention, a torque converter is omitted. Therefore, gasoline consumption can be reduced with the instant invention. For example, with a torque converter, one liter of gas will drive a vehicle about 10 miles. Without a torque converter, however, a liter of gasoline will drive the vehicle about 12 miles. Therefore, the present invention provides for a simplified system having improved fuel economy when compared with conventional torque converter clutch systems.

The present invention also has a reduced number of parts compared to conventional systems. Because the drums of the third, fourth and fifth clutches 74,76 and 78 in the two-shaft embodiment of FIG. 2 may not rotate, a quieter system is obtained than that of the prior art. For example, if the first or second clutches 70,72 are actuated, then the drums of third through the fifth clutches 74,76 and 78 will be non-rotated. Therefore, a minimum of only two drums for the first and second clutches 72,72 can rotate. On the other hand, if one of the third, fourth or fifth clutch 74,76 or 78 is actuated, then only that clutch 74,76 and 78 will have its drum rotated along with the drums of the first and second clutches 70 and 72. Therefore, when one of the third, fourth or fifth clutches 74,76,78 is actuated, then only a total of three drums will be rotating. In particular, the drum of the actuated clutch 74,76 or 78 as well as the drums of clutches 70 and 72 will be rotating. Because all of the drums of the present invention do not need to rotate in the embodiment of FIG. 2, a quieter arrangement can be obtained.

The instant invention also has advantages over the prior art in that a total mechanical control system is avoided. The electronic control means 16 of the present invention avoids many moving parts found in the prior art. Therefore, there is less wear and tear on the instant system. Also, it is easier to vary the parameters of the gear change in the instant invention because the electronic control means 16 can easily be reprogrammed. This electronic control means 16 can include an onboard computer or a programmed chip having the required information. The electronic control means 16 will operate to actuate only one of the solenoid valves 50,52,54,56 and 58. When the vehicle is traveling from 0 to 15 km per hour, a first state solenoid valve will be actuated.

The sequence of events is that the shift lever 14 of the gear selector 12 must be moved to the drive position. This will send the drive signal to the electronic control means 16. The accelerator pedal 28 will then be depressed in order to send an acceleration signal to the electronic control means 16. By determining the speed of the vehicle through the speed signal sent from the speedometer 20 to the electronic control means 16, the electronic control means 16 can determine which valve should be opened.

As noted above, if the vehicle is traveling from 0 to 15 km per hour, a first stage solenoid is actuated thereby causing an associated clutch to be actuated. In the drawings, a particular clutch order 70,72,74,76 and 78 is shown. These clutches are connected to respective solenoid valves 50,52,54,56 and 58. The electronic control means 16 can actuate these valves in any order. Normally the clutch having the largest gear attached thereto, will be hydraulically connected to the first valve to be actuated. For the FIG. 2 embodiment, the fifth clutch 78 has the largest gear 126 connected thereto. Therefore, valve 58 would be the first stage solenoid valve and would be actuated first. The valve connected to the clutch having the second to the largest gear will thereafter be actuated. In the FIG. 2 embodiment, the order of clutch activation will be 78,70,72,76 and 74.

While the clutches 70,72,74,76 and 78 are shown in a particular arrangement in differential gear housing 24, the placement of the individual clutches can easily be varied. For example, clutches 78 and 74 could be mounted on the second shaft 110 and the remaining clutches could be in any order on the engine shaft 84. It is simply desired that the clutch arrangement fit within the confines of a conventionally sized differential gear housing.

When the vehicle is traveling from 0 to 15 km per hour, a first stage solenoid valve, such as valve 58 is operated in order to actuate the associated fifth clutch 78. From 15 to 25 km per hour, a second stage solenoid valve 50 is operated to actuate clutch 70.

The third stage solenoid valve 52 is actuated in order to actuate the second clutch 72 when the vehicle travels from 25 to 45 km per hour. The fourth stage solenoid valve 56 is actuated when the vehicle travels from 45 through 60 km per hour in order to actuate the fourth clutch 76. Finally, when the vehicle is traveling 60 miles or more, the fifth stage solenoid valve 54 is actuated in order to actuate the third clutch 74.

The hydraulic conduits 60,62,64,66 and 68 can be changed or the order of the valves 50,52,54,56 and 58 can be changed in order to change the order of actuation of a particular clutch or clutch location within the housing 24. As noted above, the placement of clutches 70,72,74,76 and 78 within housing 24 can be varied. The valves 50–58 can be arranged to operate from the right to the left as seen in FIG. 1 or can operate in any other order. The valves will simply be operated in a sequential manner.

It should be noted that there is a certain overlap between the various speeds. For example, when the vehicle is traveling at 15 miles per hour, either the first or second stage solenoid valves 58,50 would be actuated. However, both valves are not simultaneously actuated in order to engage both clutches 78 and 70. Rather, if the vehicle travels from a speed less than 15 km per hour to a speed of 15 km per hour, then the first solenoid stage valve 58 is actuated in the embodiment shown in FIG. 2. When the vehicle speed exceeds 15 miles per hour, then the second stage solenoid 50 will be actuated. On the other hand, if the vehicle speed is decreasing to 15 miles per hour, the second stage solenoid valve 50 will be actuated. When the speed drops below 15 miles per hour, the first stage solenoid valve 58 will be actuated in order to actuate the first clutch 70. In this manner, the solenoids valves 50–58 are sequentially activated in order to sequentially activate the first, second, third, fourth and fifth clutches 70,72,74,76 and 78, respectively in the desired order. The switching between the solenoid valves only takes a microsecond. Suspension shock is avoided in the instant invention. Therefore, a very smooth ride is provided with the automatic transmission system of the present invention.

While the first through the fifth stages have been recited as taking place between the speeds of 0–15, 15–25, 25–45, 45–60 and 60 and above, any particular speed ranges could easily be set. It is a very easy matter to reprogram the electronic control means 16 in response to the engine size, car specification, and other criteria.

Also, it has been stated that the valves 50–58 will be sequentially operated. The electronic control means 18 will activate a next stage valve and deactivate the currently operating valve. Due to pressure of the hydraulic fluid and the timing of the control means 16, however, the first actuated valve will not immediately release. As the second actuated drum 158 has its plates 160 engaging the disc 162 by 20%, for example, the first actuated drum will have its plates released by about 20% from the disc 162. These ratios are given by way of example and can easily be controlled by the electronic control means 16. Basically, as one set of disc and plates of one drum is gradually disengaged, the next set of disc and plates of the next activated drum will be gradually engaged. The control means 16 will control the valves 50–58 to vary the flow of oil or other media to the clutches 70–78. The specifications of the car and engine can be used when programming the control means 16 to provide these desired ratios. There can be a microsecond between release of the first actuated clutch and active engagement of the second actuated clutch. This delay accommodates the time needed for piston 164 to move within the housing 150 and for the plates 160 to frictionally engage the discs. A very smooth ride is therefore obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An automatic transmission system for use in a vehicle, the vehicle having an engine with an engine shaft and the automatic transmission comprising:

an accelerator pedal, a brake pedal, a speedometer and a gear selector;

drive means for moving the vehicle, the drive means being engagable and disengagable with the engine shaft;

electronic control means for controlling the drive means, the electronic control means being electrically connected to the accelerator pedal, the brake, the speedometer and the gear selector, movement of the accelerator pedal sending an acceleration signal to the electronic control means, depression of the brake pedal sending a braking signal to the electronic control means, the speedometer sending a speed signal to the electronic control means and movement of the gear selector to a drive position sending a drive signal to the electronic control means; and valve control means operatively connected to the electronic control means, the valve control means containing a plurality of valves, the electronic control means sequentially operating the valves in response to the acceleration signal, the braking signal, the speed signal and the drive signal;

the valve control means being operatively connected to the drive means, the drive means containing a clutch for each of the valves of the valve control means, the clutches being sequentially engaged by sequential operation of the valves to connect the engine shaft with an axle of the vehicle to thereby drive the vehicle, each of the clutches comprises a rotatable drum with a plurality of plates and rotatable discs corresponding to the plates, the plates being nonrotatably mounted on the drum, each of the drums containing a movable piston for moving the plates into engagement with the discs such that rotation of the drums and plates will thereby rotate the discs, the discs being engaged with gears for rotating an axle of the vehicle to thereby drive the vehicle, operation of a valve associated with a clutch causing the piston of the clutch to move the plates into engagement with the discs, wherein five valves and five clutches are provided, each valve being hydraulically connected to one of the clutches, the valves being sequentially operated by the electronic control means such that the clutches are sequentially operated whereby only one clutch at a time will have the disc thereof engaged by the plates in order to drive the vehicle.

2. The automatic transmission as recited in claim 1, wherein the engine shaft is continuously rotated when running, the automatic transmission further comprises an oil pump and oil supply conduits, the oil pump being directly in line with and engaged with the engine shaft, the oil pump being driven by the engine shaft, the oil conduits being connected between the oil pump, the valve control means and the clutches, opening of one of the valves permitting oil to flow to the clutch associated with the valve whereby the piston will move the plates of the clutch to engage the discs.

3. An automatic transmission system for use in a vehicle, the vehicle having an engine with an engine shaft and the automatic transmission comprising:

an accelerator pedal, a brake pedal, a speedometer and a gear selector;

drive means for moving the vehicle, the drive means being engagable and disengagable with the engine shaft;

electronic control means for controlling the drive means, the electronic control means being electrically connected to the accelerator pedal, the brake, the speedometer and the gear selector, movement of the accelerator pedal sending an acceleration signal to the electronic control means, depression of the brake pedal sending a braking signal to the electronic control means, the speedometer sending a speed signal to the electronic control means and movement of the gear selector to a drive position sending a drive signal to the electronic control means; and valve control means operatively connected to the electronic control means, the valve control means containing a plurality of valves, the electronic control means sequentially operating the valves in response to the acceleration signal, the braking signal, the speed signal and the drive signal;

the valve control means being operatively connected to the drive means, the drive means containing a clutch for each of the valves of the valve control means, the clutches being sequentially engaged by sequential operation of the valves to connect the engine shaft with an axle of the vehicle to thereby drive the vehicle, wherein the engine shaft is continuously rotated when running, the automatic transmission further comprises an oil pump and oil supply conduits, the oil pump being directly in line with and engaged with the engine shaft, the oil pump being driven by the engine shaft, the oil conduits being connected between the oil pump, the valve control means and the clutches, opening of one of the valves permitting oil to flow to the clutch associated with the valve to thereby enable the clutch to connect the engine shaft with the axle of the vehicle to thereby drive the vehicle.

4. An automatic transmission system for use in a vehicle, the vehicle having an engine with an engine shaft and the automatic transmission comprising:

an accelerator pedal, a brake pedal, a speedometer and a gear selector;

drive means for moving the vehicle, the drive means being engagable and disengagable with the engine shaft;

electronic control means for controlling the drive means, the electronic control means being electrically connected to the accelerator pedal, the brake, the speedometer and the gear selector, movement of the accelerator pedal sending an acceleration signal to the electronic control means, depression of the brake pedal sending a braking signal to the electronic control means, the speedometer sending a speed signal to the electronic control means and movement of the gear selector to a drive position sending a drive signal to the electronic control means; and valve control means operatively connected to the electronic control means, the valve control means containing a plurality of valves, the electronic control means sequentially operating the valves in response to the acceleration signal, the braking signal, the speed signal and the drive signal;

the valve control means being operatively connected to the drive means, the drive means containing a clutch for each of the valves of the valve control means, the clutches being sequentially engaged by sequential operation of the valves to connect the engine shaft with an axle of the vehicle to thereby drive the vehicle, wherein the drive means includes a plurality of clutches mounted on the engine shaft and a plurality of clutches mounted on a second shaft, the clutches on the second shaft being connected to the engine shaft through connection gears, the engine shaft being continuously rotated when the engine is running, each of the clutches including a drum, the drums of the clutches on the second shaft being continuously rotated when the engine shaft is rotating, the drums of the clutches on the engine shaft being stationary except when the valve associated with the clutch is actuated to thereby engage the clutch.

5. The automatic transmission as recited in claim 4, wherein at least three drums are mounted on the engine shaft, all of the drums of the drive means being operatively connectable to the axle of the vehicle, the clutches on the engine shaft being connectable to the axle through clutch gears associated with each clutch and through the second shaft, the drums of the clutches on the second shaft being out of driving engagement with the second shaft when the second shaft is driven through one of the clutches on the engine shaft, the drums on the engine shaft being stationary when one of the drums on the second shaft is drivingly engaged with the second shaft to thereby drive the vehicle.

6. An automatic transmission system for use in a vehicle, the vehicle having an engine with an engine shaft and the automatic transmission comprising:

an accelerator pedal, a brake pedal, a speedometer and a gear selector;

drive means for moving the vehicle, the drive means being engagable and disengagable with the engine shaft;

electronic control means for controlling the drive means, the electronic control means being electrically connected to the accelerator pedal, the brake, the speedometer and the gear selector, movement of the accelerator pedal sending an acceleration signal to the electronic control means, depression of the brake pedal sending a braking signal to the electronic control means, the speedometer sending a speed signal to the electronic control means and movement of the gear selector to a drive position sending a drive signal to the electronic control means; and valve control means operatively connected to the electronic control means, the valve control means containing a plurality of valves, the electronic control means sequentially operating the valves in response to the acceleration signal, the braking signal, the speed signal and the drive signal;

the valve control means being operatively connected to the drive means, the drive means containing a clutch for each of the valves of the valve control means, the clutches being sequentially engaged by sequential operation of the valves to connect the engine shaft with an axle of the vehicle to thereby drive the vehicle, wherein the drive means includes a first shaft and a second shaft, the first and second shafts are generally parallel to the engine shaft, the engine shaft is between the first and second shafts, a plurality of clutches being mounted on each of the two shafts, the clutches being connected to the engine shaft through connection gears, the clutches each including a drum which is rotated when the engine shaft is rotated, all of the drums of the drive means being operatively connectable to the axle of the vehicle, the drums of the clutches on the first shaft being connectable to the axle through the first shaft, through gears between the first and second shafts and then through the second shaft, the drums of the clutches on the second shaft being out of driving engagement with the second shaft when the second shaft is driven through one of the clutches on the first shaft, the drums on the second shaft being freely rotatable on the second shaft except when the drum is actuated by the valve whereupon the rotating drum will drive the second shaft to thereby drive the axle of the vehicle.

\* \* \* \* \*